US006321152B1

(12) United States Patent
Amborski et al.

(10) Patent No.: US 6,321,152 B1
(45) Date of Patent: Nov. 20, 2001

(54) SYSTEM AND METHOD FOR INHIBITING SATURATION OF A HYDRAULIC VALVE ASSEMBLY

(75) Inventors: Stephen P. Amborski, Kobe (JP); John J. Krone, Dunlap; Steven T. Ufheil, East Peoria, both of IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/464,573

(22) Filed: Dec. 16, 1999

(51) Int. Cl.[7] .................... F16D 31/02
(52) U.S. Cl. .................... 701/50; 60/422; 60/430
(58) Field of Search .................... 701/50; 60/422, 60/426, 455, 427, 452, 420, 421; 180/53.4, 6.2

(56) References Cited

U.S. PATENT DOCUMENTS

| | | | | |
|---|---|---|---|---|
| 4,070,857 | | 1/1978 | Wible | 60/422 |
| 4,437,307 | | 3/1984 | Budzich | 60/427 |
| 4,712,376 | | 12/1987 | Hadank et al. | 60/427 |
| 5,083,430 | * | 1/1992 | Hirata et al. | 60/445 |
| 5,155,996 | | 10/1992 | Tatsumi et al. | 60/431 |
| 5,168,705 | * | 12/1992 | Hirata et al. | 60/452 |
| 5,174,115 | | 12/1992 | Jacobson et al. | 60/484 |
| 5,182,908 | | 2/1993 | Devier et al. | 60/420 |
| 5,590,731 | | 1/1997 | Jacobson | 180/53.4 |
| 6,082,106 | * | 7/2000 | Hamamoto | 60/422 |

FOREIGN PATENT DOCUMENTS

0785311 A2 1/1997 (EP) .

* cited by examiner

*Primary Examiner*—William A. Cuchlinski, Jr.
*Assistant Examiner*—Marthe Y. Marc-Coleman

(57) ABSTRACT

A control system and method for detecting and inhibiting an impending full saturation condition in a hydraulic system of a work machine wherein the hydraulic system includes a hydraulic pump for supplying fluid under pressure to the hydraulic system and a plurality of control valves for controllably passing fluid from the pump to a plurality of work elements, the present control system including an electronic controller coupled to both an operator input device actuatable to control the operation of the work elements and a plurality of control valves for controlling the fluid flow to the work elements, the controller being operable to determine the actual margin pressure of the hydraulic pump in response to comparing the pump pressure to the pressure of the heaviest loaded work element requested by an operator through the actuation of the operator input device and to compare the actual margin pressure to the established margin pressure for the pump. Based upon this comparison, the controller is further operable to output appropriate signals to the control valves to limit fluid flow thereto in accordance with some type of valve prioritization scheme when the actual margin pressure of the pump is less than the established margin pressure. The present control system and method functions as an early warning system to both detect the onset of an impending full saturation condition and to implement appropriate procedures to inhibit further saturation and limit any resultant valve starvation.

22 Claims, 3 Drawing Sheets

SYSTEM AND METHOD FOR INHIBITING SATURATION OF A HYDRAULIC VALVE ASSEMBLY

TECHNICAL FIELD

This invention relates generally to control of hydraulic valve systems and, more particularly, to a system and method for monitoring margin pressure in a hydraulic system to detect an impending saturation condition and for implementing measures to control the system so as to limit further saturation thereof.

BACKGROUND ART

In the operation of a fluid system serving a plurality of work elements, the work elements often demand large volumes of fluid from their associated hydraulic fluid pumps. Situations arise where the work elements demand fluid at a rate greater than the capacity of the hydraulic pump, thus flow limitation or "saturation" occurs. Full saturation occurs at the point at which the pump pressure is substantially the same as the pressure at the work element.

Depending upon the specific machine application, the flow demands of the work element may exceed the flow capacity of the pump or pumps if the hydraulic system remains in a fixed element priority. In this state, control of the work elements is severely limited. Attempts by the operator to adjust the inputs correctly to avoid or overcome this state often lead to poor production. For example, as an agricultural tractor using a seed spreading implement approaches the end of a row and prepares to turn, the seed spreading implement is raised as the implement continues to spread the seed. If the demand on the electro-hydraulic pump is greater than what it can produce, other valves will be "starved" as pump flow is rerouted to the valve controlling the lifting of the seed spreading implement. An area of unseeded land is produced if one of the valves being starved is the valve controlling the spreading of the seed. The process of starving some more heavily loaded valves to supply pump flow to a valve under a lower load demand is a result of a saturation condition. In addition, automatic functions, such as an auto dig cycle for an excavator, cannot be implemented on such a machine. When saturation occurs during an automatic function cycle, the machine stalls or incorrectly performs the function.

Known attempts to address the problem of flow saturation include a priority system and a pressure compensation system. The former solution gives priority to one valve over all other valves in a given system. One of the valves receives pump flow while the other valves are starved. For example, a plurality of control valves can pass fluid from a pump to a plurality of respective work elements. A preprogrammed controller responsively determines the priority in which fluid is distributed from the pump to the respective control valves and then the controller delivers control signals to the respective control valves in response to the determination to control the amount of flow through each valve, for example, by selectively positioning the stem of the respective control valves. In the latter solution, the pressure compensation system, there is proportional scaling back of flow to all control valves in the system when the load demand exceeds what the hydraulic pump can supply.

Other known systems of dealing with saturation include simply increasing pump speed in an attempt to provide more output flow to the valves. None of the known methods for addressing the problem of saturation has confronted the saturation problem before the situation has fully occurred, that is, previous methods have not attempted to predict a saturation condition and limit fluid flow to prevent valve starvation. Rather, the problem of saturation has conventionally been addressed only after the condition has completely developed and valves are being starved, either fully or in part.

Accordingly, the present invention is directed to overcoming one or more of the problems as set forth above.

DISCLOSURE OF THE INVENTION

The present system and method for implementing some type of valve prioritization scheme permits monitoring of a hydraulic system having multiple fluid valves in order to predict a saturation condition before system control is degraded. The present system then initiates system adaptations to inhibit further progression of a decrease in actual margin pressure and to inhibit the saturation condition thereby preventing a more severe reduction in work element performance level which would otherwise be caused by such saturation. The present system is, in effect, an early warning system to prevent valve starvation by noting a decrease in margin pressure and, before any valve is adversely affected, limiting fluid flow to prevent unintentional starving of the valves.

More specifically, the present system and method provides constant monitoring of the actual margin pressure and a comparison of the actual margin pressure with a preset, e.g., predetermined, established margin pressure allows detection of initiation of a saturation condition when it is determined that the actual margin pressure has just begun to fall below the established margin pressure. It is understood that "margin pressure" is the difference between the maximum supply pressure of which the pump is capable and the current highest load pressure which is demanded by the operator. The established margin pressure is set at a level intended to provide a buffer region between the pressure level which will be commanded by the operator and that which is available based upon the maximum capabilities of the system pump. If, during the constantly repeating monitoring cycle of the present system, a slight margin pressure deficit is detected, immediate correction is implemented according to a predetermined scheme such as implementing priority flow or proportional scaled-down flow to the various valves of the system.

In one aspect of the present invention, a control system and method for detecting and inhibiting an impending saturation condition in a hydraulic system of a work machine is disclosed, the hydraulic system including a hydraulic pump for supplying fluid under pressure to the system and a plurality of control valves for controlling fluid flow from the pump to a plurality of work elements. The present control system includes at least one operator input device actuatable to control the operation of the work elements and an electronic controller coupled to both the operator input device and the respective control valves, the controller being operable to receive signals from the operator input device indicative of the commanded fluid flow to at least one of the respective work elements, and being further operable to output signals to the respective control valves to control the fluid flow to the respective work elements based upon the signals received from the operator input device. In accordance with the teachings of the present invention, the controller is also operable to determine the actual margin pressure of the hydraulic pump in response to the total commanded fluid flow requested through actuation of the operator input device, and the controller is further operable to compare the actual margin pressure of the pump to an established margin pressure and to output appropriate signals to the control valves to implement a predetermined fluid flow to the respective work elements when the actual margin pressure of the pump is less than the established margin pressure.

In another aspect of the present invention, besides monitoring the margin pressure of the system, the controller is still further operable to determine the total commanded fluid flow to the respective work elements in response to actuation of the operator input device; to determine the maximum pump flow based upon the current pump speed; to compare the total commanded fluid flow to the maximum pump flow capacity; and to output appropriate signals to the control valves to establish a predetermined fluid flow to the respective work elements when the total commanded fluid flow is greater than the maximum pump flow.

BRIEF DESCRIPTION OF THE DRAWINGS

For a better understanding of the present invention, reference may be made to the accompanying drawings in which.

BEST MODE FOR CARRYING OUT THE INVENTION

Figure 1:
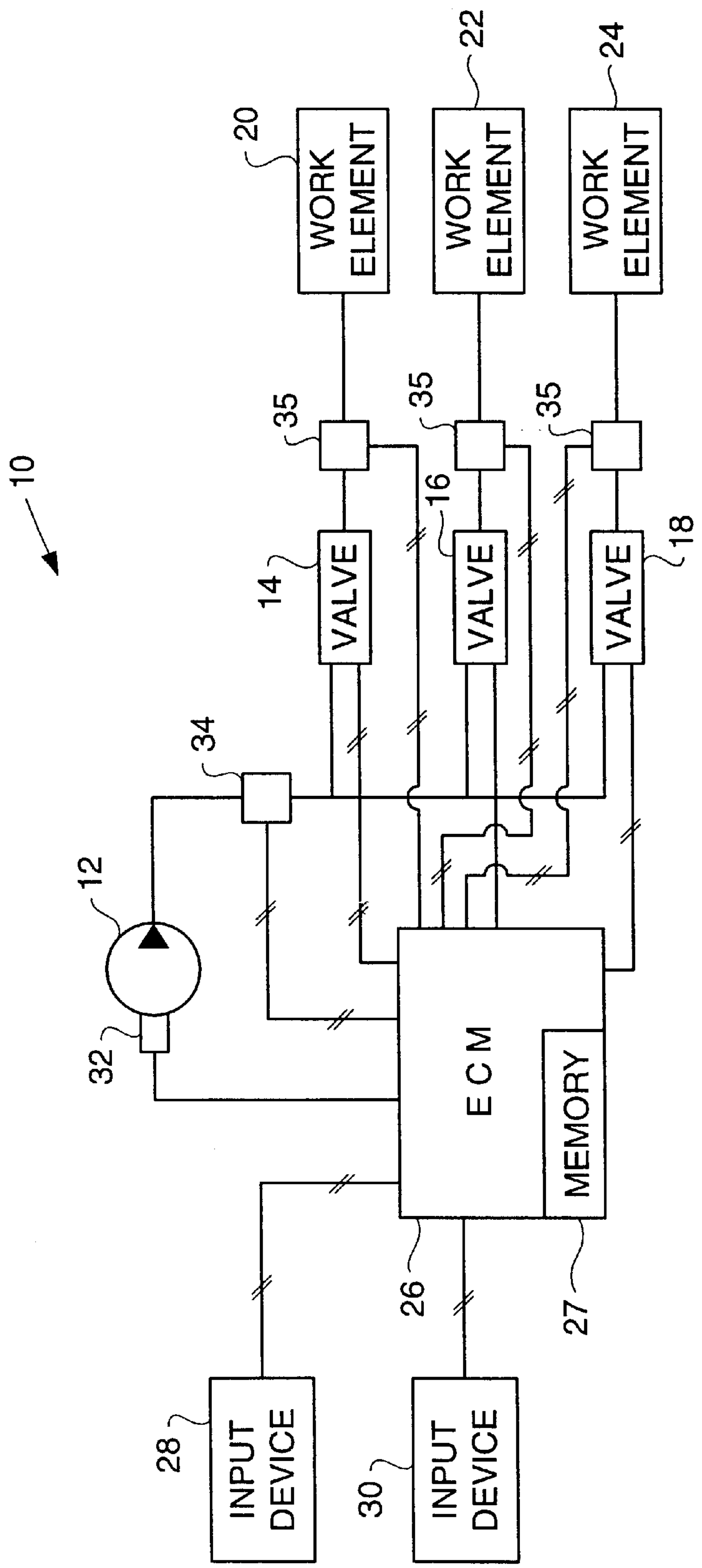
FIG. 1 is a diagrammatic view of an embodiment of a hydraulic system of the present invention.

Referring to the drawings, and particularly to FIG. 1, numeral 10 designates generally an electro-hydraulic system constructed in accordance with the teachings of the present invention for controlling fluid flow to a plurality of work elements associated with a work machine. The work machine has an engine (not shown) and at least one fluid circuit which has at least one pump 12 driven by the engine in a conventional manner. A plurality of control valves, for example, as indicated at 14, 16 and 18, controllably pass fluid from pump 12 to a plurality of respective work elements such as the work elements 20, 22 and 24. The control valves 14, 16 an 18 are electrically actuatable in a manner such that the fluid flow is controlled by electrical signals.

System 10 further includes a controller such as electronic control module (ECM) 26 having a memory 27 which is coupled to the valves 14, 16 and 18 as shown in FIG. 1. The ECM 26 is operable to provide electrical signals to direct the operation of the valves 14, 16 and 18 as to the amount of fluid flow to be provided to the corresponding work elements 20, 22 and 24, or other work attachments.

Operator control input devices 28 and 30, for example, control levers or electronic joysticks, are connected to ECM 26 and provide demand signals which correspond to select settings of each respective operator input device. For instance, a potentiometer or digital encoder delivers distinguishable signals for different settings. The ECM 26 receives these demand signals indicative of operator demand for fluid flow to the work elements.

Further information is provided to ECM 26 by a pump speed sensor 32 and a pump output pressure sensor 34. A preset margin pressure based on the capabilities of the pump and the requirements of the various work elements and/or attachments of system 10 is programmed into ECM 26 and is thus "established" for constant reference thereto during use of the present system in order to avoid saturation to such an extent that any valves become unintentionally starved. For example, if the established margin pressure value is set at 300 psi, the hydraulic pump will maintain 300 psi over the pressure needed to move the heaviest load for a particular application. When saturation starts to occur, the margin pressure will begin to decrease below 300 psi until the pressure of the heaviest load is reached at which point the margin pressure will be zero.

Figure 2:
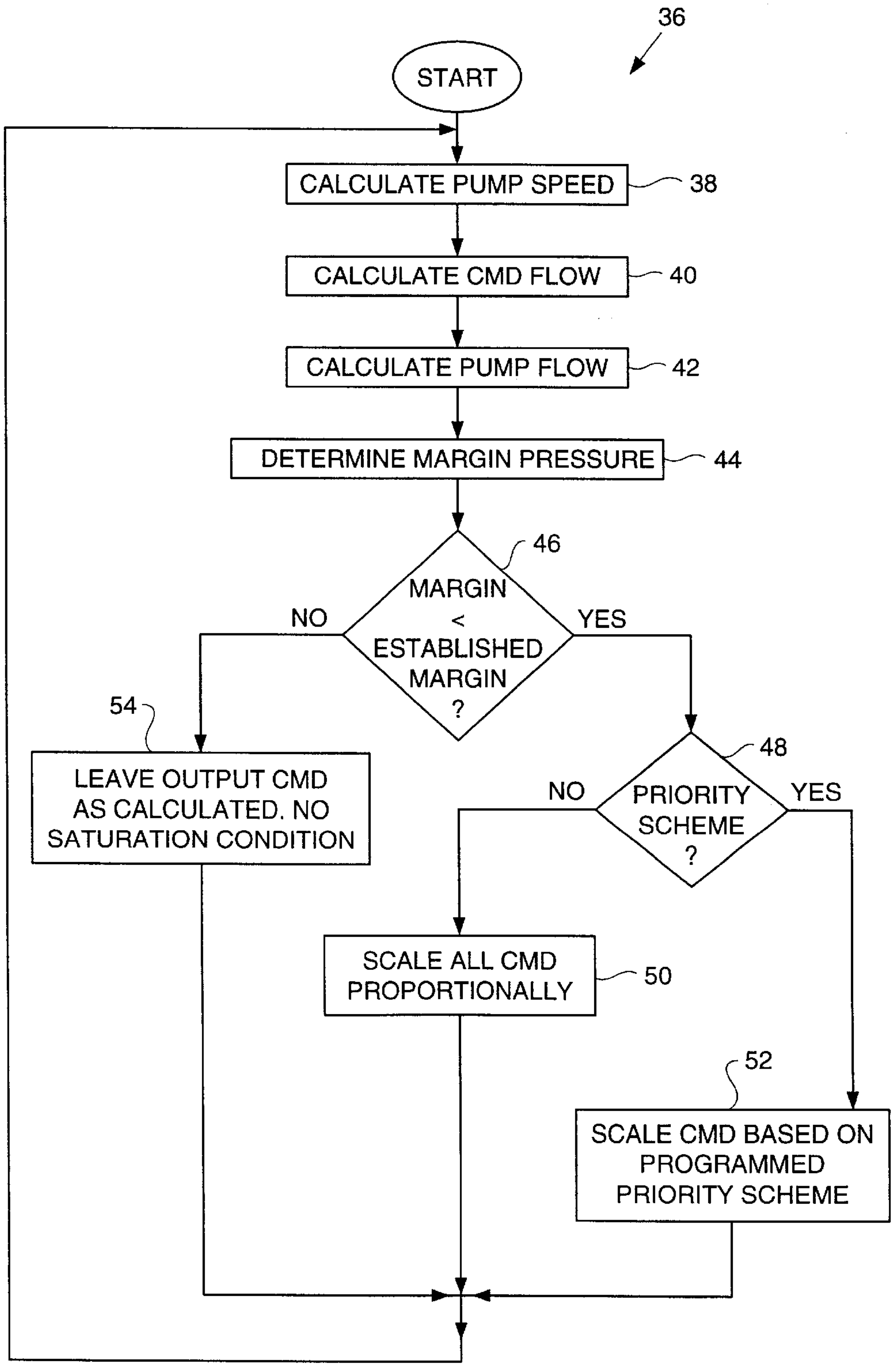
FIG. 2 is a flow chart showing the control system incorporating saturation control features in accordance with the principles of the present invention.

With reference to FIG. 2, number 36 indicates, generally, one embodiment of a method for controlling a hydraulic system in accordance with and embodying the teachings of the present invention. The method of FIG. 2 is a constantly repeating cycle for early detection of an impending saturation condition and, when an impending saturation condition is detected, steps are immediately implemented to inhibit full saturation and limit any resultant valve starvation. The method of FIG. 2 includes calculating pump speed at step 38, calculating pump command flow at step 40, calculating the maximum possible pump flow at step 42, and then determining actual current margin pressure at step 44. It is to be understood that steps 40 and 42 can be reversed in order without affecting the efficacy of the present method. The actual margin pressure is then compared at step 46 to an established margin pressure that was originally programmed into ECM 26 and stored in memory 27 as described above. Based upon this comparison, it is determined whether a saturation condition is about to occur.

If the current margin pressure calculated at step 44 (determined by the ECM) is less than the established margin pressure, an initial saturation condition is taking place and steps are taken, for example, steps 48, 50 and 52 illustrated in FIG. 2, to correct the condition and to prevent the saturation condition from advancing to a point of reduced performance or valve starvation. Such corrections are implemented at step 48 wherein a choice is made whether or not to use a priority scheme. If a priority scheme is not selected, command flow to all valves is scaled down proportionately to account for available flow, as at step 50, and the system continues to monitor system performance by returning to step 38 and repeating the subsequent steps.

If a priority scheme is selected at step 48, commanded flow from the valves 14, 16, 18 to the various work elements 20, 22, 24 will be scaled based upon a programmed priority scheme which may be predetermined and inputted into the ECM such as at step 52. Thereafter, the system repeats steps 38 through 46 and the comparison is again made at step 46 between actual margin pressure and established margin pressure. If the actual margin pressure is not less than the established margin pressure, the flow output command is not changed, but is left as originally calculated because there is no impending saturation about to occur as indicated at step 54.

More specifically, the various calculations of system 36 are accomplished, for example, as described hereafter. With regard to step 38, the calculation of pump speed can be determined directly from pump speed sensor 32; it can be calculated by inputting the engine speed of the work machine to ECM 26 using well known engine speed sensors and thereafter having ECM 26 calculate the pump speed using known equations or by referring to a map or look-up table containing the relationship between engine speed and pump speed; or pump speed can be determined by inputting other operational parameters of the work machine into ECM 26 for determination thereby. A wide variety of different types of sensors known to those skilled in the art can be utilized to input machine parameters and flow characteristics to ECM 26 so that ECM 26 can calculate the current pump speed.

In step 40 the calculation of demand or "command" flow is determined by ECM 26 based upon movement of the operator control or input device provided on the work machine for controlling the operation of a particular work element. The control input action taken by the operator determines the amount of flow through a particular valve 14, 16 and 18. For example, the operator may signal for a valve to a particular work element to be half-open, full open, or some other incremental position, and such information is inputted into ECM 26. Based upon the demand signal inputted by the operator for fluid flow to the work elements or other attachments, ECM 26 will determine the total commanded flow for all of the commanded valves and will output an appropriate operating signal to the appropriate control valves.

Calculation of pump flow at step 42 is determined according to the maximum possible pump flow based on the current pump speed as determined in step 38 and the maximum rated pump capability, which data has also been inputted into ECM 26. At step 42, ECM 26 will determine the maximum possible pump flow for the given pump speed.

At step 44, ECM 26 determines the actual margin pressure of the system by comparing the actual output pressure of pump 12 with the actual load pressure being experienced by the work element. Since the actual output pressure of the pump will normally be equal to the actual load pressure plus the margin pressure, the difference between the actual pump output pressure and the highest of the actual load pressure will yield the actual margin pressure. Other methods for determining the actual margin pressure can likewise be utilized.

If the system is operating well within limits, the actual margin pressure will always be at least as great as the established margin pressure for the system. Once the operating pressure reaches and attempts to surpass the maximum system pressure, the actual margin pressure will be less than the "established" margin pressure until the pump output pressure reaches the maximum pressure for the system whereat the actual margin pressure will be zero. Pump output pressure sensor 34 will output a signal to ECM 26 indicative of the actual output pressure of pump 12 and the actual load pressure being exerted against the respective work elements can be similarly inputted to the ECM 26 by properly positioned sensors 35, as is well known in the art. Based upon these pressure signal inputs, ECM 26 can be programmed to compare such pressures and determine the actual margin pressure of the system. Other methods for determining actual margin pressure can likewise be utilized.

The established margin pressure for pump 12 is preset and stored into the memory 27 of ECM 26. The margin pressure of any pump is always preset or established based upon system parameters and such margin pressure is usually set through the use of a spring or other biasing mechanism associated with the particular pump. While margin pressure is generally preset and fixed, it can be made variably selectable, if desired. However, once a load or pressure margin is selected and inputted into ECM 26 it is considered by the present system to be set or "established" for purposes of the system function. At step 46, ECM 26 retrieves the established margin pressure for pump 12 from memory 27 and will thereafter compare such established margin pressure with the actual margin pressure calculated at step 44.

All of the above-discussed processes are accomplished automatically, repeatedly and continually by ECM 26 to provide constant monitoring of the margin pressure differential in order to predict impending saturation and to prevent possible valve starvation by implementing corrective measures.

Figure 3:
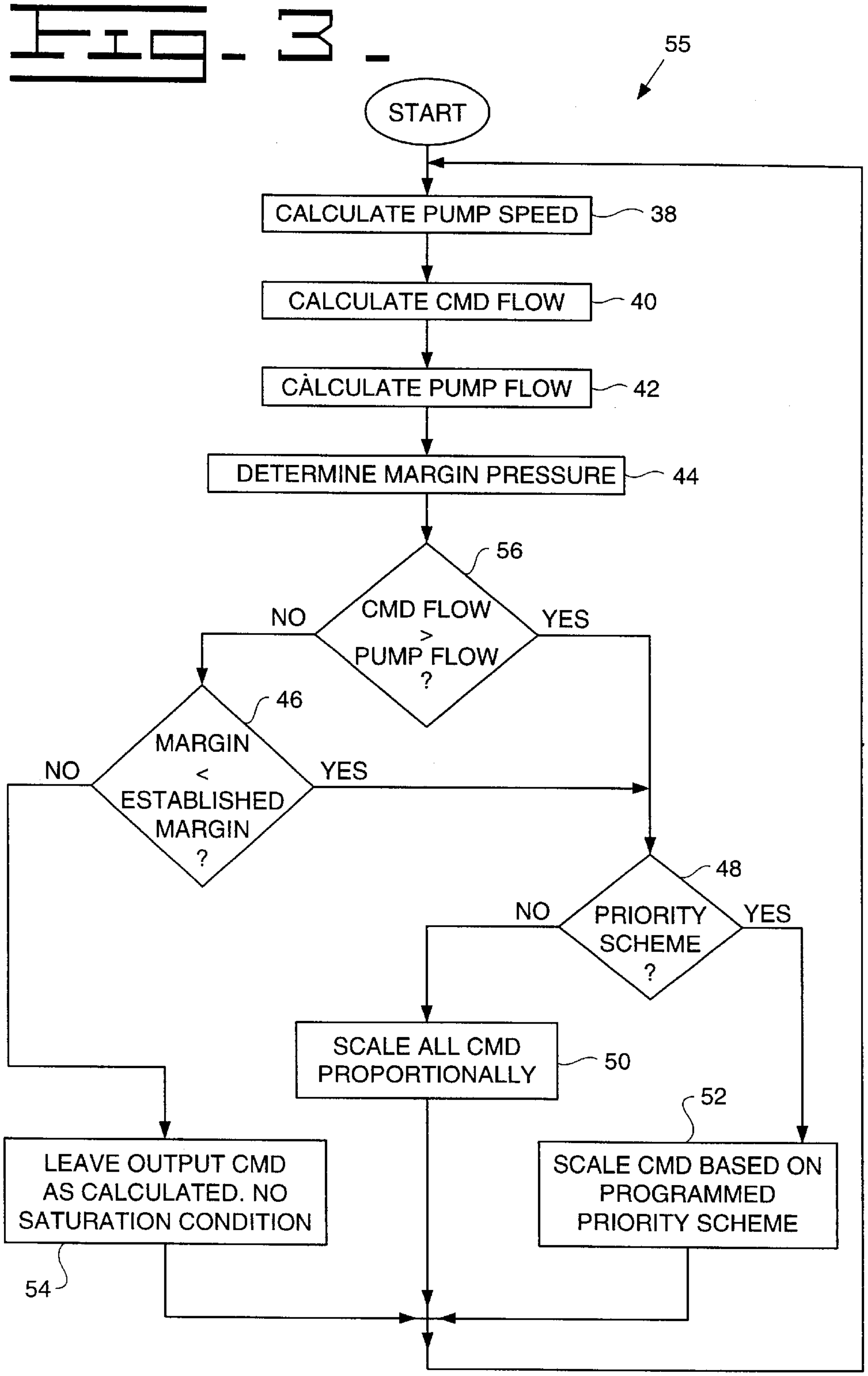
FIG. 3 is a flow chart showing an alternative control system incorporating saturation control features in accordance with the principles of the present invention.

FIG. 3 sets forth the operating steps of another flow chart 55 wherein the teachings of the present invention are incorporated. Flow chart 55 represents use of the present invention in conjunction with a typical saturation control system wherein the total calculated "command" flow for all valves is compared to the maximum pump flow. In the flow chart of FIG. 3, margin pressure is likewise monitored as previously explained so as to provide an early warning in those situations where the total calculated "commanded" flow is less than the calculated "maximum" pump flow. The monitoring of margin pressure in flow chart 55 also serves as a "fail-safe" mechanism in those situations where the calculated total command flow and/or calculated maximum pump flow are inaccurate due to miscalculation or due to the fact that the pump is not operating as expected due to normal wear and tear or other inefficiencies. With reference to FIG. 3, all of the calculations set forth therein are performed in similar manner as described with reference to the operating steps of flow chart 36 illustrated in FIG. 2.

In the above scenario, operating steps 38 through 44 are as previously explained with reference to FIG. 2. Step 56 has been inserted between step 44 and 46 as illustrated in FIG. 3. In a normal situation, the total commanded flow will be less than the maximum pump flow calculated based upon the given pump speed and ECM 26 will proceed to step 46 to compare the actual margin pressure with the established margin pressure.

If the actual margin pressure is not less than the established margin pressure, ECM 26 will proceed to step 54 and proceed as previously explained with respect to control loop 36 of FIG. 2. If, on the other hand, the actual margin pressure is less than the established margin pressure as compared in step 46, ECM 26 will proceed to step 48 and further proceed as previously explained with respect to FIG. 2. This situation can occur when the total commanded flow at step 56 is still indicated as being less than or equal to the maximum pump flow but, because the maximum pump flow is being exceeded, the established margin pressure is being reduced thereby yielding an actual margin pressure which is less than the established margin pressure. At this point, although the total "commanded" flow is perceived as being supplied by the pump, the difference between the highest load pressure and the maximum pump pressure is less than the established margin pressure value and, as a result, the present control system will proceed to step 48 to limit fluid flow from the respective valves to the associated work elements.

This same situation may occur at step 46 if, at step 56, the pump is not operating as expected and, although the total commanded flow is still indicated as being less than or equal to the maximum pump flow, the actual margin is now less than the established margin pressure. Still further, this same scenario may likewise occur if any of the calculations relating to pump speed, pump flow and commanded flow are miscalculated for whatever reason. The present control system, as embodied in flow chart 55 of FIG. 3, therefore functions as an early warning or fail-safe system to prevent an unintended saturation condition from occurring. In the event that the commanded flow is greater than the maximum pump flow at step 56, ECM 26 will immediately proceed to step 48. However, it is recognized that the system could still continuously compare established margin pressure and actual margin pressure and not allow the step 56 to proceed to step 48 as long as the established and actual margin pressure remain equal.

Industrial Applicability

Using the above-described system and method, a priority strategy routine controls the amount of flow delivered to each of the valves in a saturation condition in a manner predetermined by the factory or by an end user's desired parameters. For example, in the tractor spreading seed situation described above, the end user can input the appropriate parameters to the work machine to give a higher flow priority to the seed spreading implement and to the control valve spreading the seed, while giving a lower flow priority to other non-critical valves. Customer parameters can be inputted, for example, by using a service tool such as a lap top computer or through the use of an operator input panel located in the operator cab of the machine. The possible flow limiting schemes are endless. For example, in a saturation condition, some valves may receive as much flow as is needed, some valves may receive a 10% reduction in flow, some values may receive a 20% reduction in flow, some valves may receive no flow, and some valves may be scaled to meet the flow of the pump. Other flow limiting combinations are likewise possible.

In the situation where the theoretical calculations computed at steps 38, 40 and 42 are no longer accurate, for example, due to leakage or wear of the system over time, or due to miscalculation, the constant repetition of checking and comparing the actual margin pressure reading with the previous reading and with the established margin pressure will catch any defect or error and commence a flow limiting strategy before unintended valve saturation occurs. Thus, the present invention alerts the user to an impending full saturation condition and commences an automatic adjustment to limit the flow to the respective valves.

The various examples shown above illustrate the great flexibility of the present control system. A user of the present invention may choose from various modifications or equivalents thereof, depending upon the desired application. In this regard, it is recognized that the various forms of the present system and method for inhibiting saturation of a hydraulic valve assembly can be utilized without departing from the essence of the invention.

Electronic controllers or modules, such as ECM 26 are commonly used in association with work machines for accomplishing various tasks. In this regard, ECM 26 will typically include processing means, such as a microcontroller or microprocessor, associated electronic circuitry such an input/output circuitry, analog circuits or programmed logic arrays, as well as associated memory. ECM 26 can therefore be programmed to sense and recognize the appropriate signals indicative of the various conditions or states of actuation of the operator control input devices 28 and 30, or the signals inputted thereto from sensors 32 and 34, and, based upon such sensed conditions, ECM 26 will provide appropriate output signals to control fluid flow to any plurality of control valves in accordance with the teachings of the present invention.

The operating steps set forth in flow charts 36 and 55 can be incorporated into the programming of the processing means of ECM 26 by techniques well known to those of ordinary skill in the art and such steps can be repeated at any predetermined rate or time interval. It is also recognized that variations to the operating steps depicted in flow charts 36 and 55 could likewise be made without departing from the sprit and scope of the present invention. In particular, steps could be added or some steps could be eliminated. All such variations are intended to be covered by the present invention. For example, with reference to flow chart 36 of FIG. 2, it is anticipated that steps 38, 40 and 42 could be eliminated and ECM 26 could be programmed to merely determine the actual margin pressure of the system at step 44 and thereafter compared the actual margin pressure with a predetermined established margin pressure at step 46, since determining the total commanded flow and the maximum pump flow are not directly utilized at operating step 46. Other changes and variations to flow charts 36 and 55 are likewise recognized and anticipated.

As is evident from the foregoing description, certain aspects of the present invention are not limited by the particular details of the examples illustrated herein, and it is therefore contemplated that other modifications and applications will occur to those skilled in the art. It is accordingly intended that the claims shall cover all such modifications and applications that do not depart from the spirit and scope of the present invention.

Other aspects, objects and advantages of the present invention can be obtained from a study of the drawings, the disclosure and the appended claims.

What is claimed is:

1. A control system for detecting and inhibiting a saturation condition in a hydraulic system of a work machine wherein the hydraulic system includes a hydraulic pump for supplying fluid under pressure to the hydraulic system, a plurality of control valves for controllably passing fluid from the pump to a plurality of work elements, the control system comprising:

at least one operator input device actuatable to control the operation of the work elements;

a controller coupled to said at least one operator input device and being operable to receive signals therefrom, each signal from said at least one operator input device being indicative of a commanded fluid flow to at least one of the respective work elements;

said controller outputting signals to the respective control valves to control the fluid flow to the respective work elements when said controller receives signals from said at least one operator input device indicative of a commanded fluid flow to the respective work elements;

memory means for storing parameters associated with the hydraulic system including an established margin pressure of the hydraulic pump;

said controller being operable to determine an actual margin pressure of the pump in response to the comparison of the pump pressure and the pressure of the highest load requested through actuation of said at least one operator input device;

said controller being further operable to compare the actual margin pressure of the pump to the established margin pressure and to output appropriate signals to the control valves to establish a predetermined fluid flow to the respective work elements when the actual margin pressure of the pump is less than the established margin pressure.

2. The control system as set forth in claim 1 wherein the appropriate signals outputted by said controller to the control valves to establish a predetermined fluid flow to the respective work elements include scaling back the commanded fluid flow to the respective work elements proportionately such that the total requested flow is reduced to no more than the maximum flow capacity of the pump.

3. The control system as set forth in claim 1 wherein said memory means includes a predetermined priority scheme to limit the commanded fluid flow to the respective control valves when the total commanded flow exceeds the maximum flow capacity of the pump, said appropriate signals outputted by said controller to the control valves to establish a predetermined fluid flow to the respective work elements including outputting appropriate signals to establish the predetermined priority scheme.

4. The control system as set forth in claim 1 wherein the signals outputted by said controller to the control valves to establish a predetermined fluid flow to the respective work elements include signals which reduce the fluid flow to certain work elements by a first predetermined reduction and reduce the fluid flow to other work elements by a second predetermined reduction.

5. The control system as set forth in claim 1 further including sensor means for determining the current speed of the hydraulic pump, said controller being further operable to determine the total commanded fluid flow to the respective work elements in response to actuation of said at least one operator input device, to determine the maximum pump flow based upon the current pump speed, to compare the total commanded fluid flow to the maximum pump flow capacity, and to output appropriate signals to the control valves to establish said predetermined fluid flow to the respective work elements when the total commanded fluid flow is greater than the maximum pump flow.

6. A system for detecting and inhibiting saturation in a hydraulic valve assembly, the system comprising:

a controller operable to receive commands and electronic signals and to output electronic signals;

at least one operator input device coupled to the controller and operable to permit an operator of the system to input commands to the controller;

a fluid pump operable to provide fluid in response to commands from the at least one operator input device;

a plurality of fluid valves coupled to the controller and in fluid communication with the pump and operable to receive command signals from the controller responsive to commands inputted to the controller via the at least one operator input device; and a plurality of work elements in fluid communication with said plurality of fluid valves to receive fluid from the pump as controlled via the valves, wherein commands inputted to the controller via the at least one operator input device determine the amount of fluid flow to each of the work elements;

said controller being programmed with an established margin pressure for the fluid pump and being further operable to perform a margin pressure check which includes determining the actual current margin pressure and comparing the actual current margin pressure to the established margin pressure and thereafter outputting appropriate signals to said plurality of fluid valves to enter a priority scheme changing fluid flow to said plurality of valves when the actual current margin pressure is less than the established margin pressure.

7. The system as set forth in claim 6 wherein said controller is further operable to repetitively perform the margin pressure check based upon a predetermined time interval.

8. The system as set forth in claim 6 including a speed sensor connected to the pump and coupled to the controller, said speed sensor being operable to determine pump speed and to transmit a signal indicative of the current pump speed to the controller, said controller being further operable to determine the total commanded pump flow to the fluid valves, to determine the maximum pump flow based upon the current pump speed inputted to the controller, to compare the total commanded pump flow to the maximum pump flow, and to output appropriate signals to said plurality of fluid valves to enter said priority scheme when the total commanded fluid flow is greater than the maximum pump flow.

9. A method for detecting and inhibiting a saturation condition in a hydraulic system of a work machine wherein the hydraulic system includes a hydraulic pump for supplying fluid under pressure to the hydraulic system, a plurality of control valves for controllably passing fluid from the pump to a plurality of work elements, the method comprising the steps of:

(a) providing at least one operator input device actuatable to control the operation of the work elements;

(b) providing a controller coupled to the at least one operator input device for receiving signals therefrom, each signal from said at least one operator input device being indicative of a commanded fluid flow to at least one of the respective work elements, said controller outputting signals to the respective control valves to control the fluid flow to the respective work elements when said controller receives signals from said at least one operator input device indicative of a commanded fluid flow to the respective work elements;

(c) determining an actual margin pressure of the pump in response to a comparison of the pump pressure with the pressure of the heaviest loaded work element requested through actuation of said at least one operator input device;

(d) determining an established margin pressure of the pump;

(e) comparing the actual margin pressure of the pump to the established margin pressure of the pump;

(f) outputting appropriate signals to the control valves to limit fluid flow to the control valves when the actual margin pressure of the pump is less than the established margin pressure.

10. The method as set forth in claim 9 wherein the appropriate signals outputted by the controller to limit fluid flow to the control valves in step (f) includes scaling back the commanded fluid flow to the respective control valves proportionately.

11. The method as set forth in claim 9 including programming the controller with a predetermined priority scheme to limit fluid flow to the perspective control valves when the actual margin pressure of the pump is less than the established margin pressure, said appropriate signals outputted by the controller to limit fluid flow to the control valves including implementing the predetermined priority scheme.

12. The method as set forth in claim 9 comprising the additional steps of:

(g) determining the speed of the pump;

(h) determining the total commanded fluid flow to the respective work elements in response to actuation of said at least one operator input device;

(i) determining the maximum pump flow based upon the pump speed determined in step (g);

(j) comparing the total command fluid flow to the maximum pump flow; and (k) outputting an appropriate signals to the control valves to limit fluid flow to the control valves when the total commanded fluid flow is greater than the maximum pump flow.

13. A method for controlling a hydraulic system of a work machine wherein the hydraulic system includes a hydraulic pump for supplying fluid under pressure to the hydraulic system, a plurality of control valves for controllably passing fluid from the pump to a plurality of work elements, the method comprising the steps of:

determining an actual margin pressure associated with the system;

determining an established margin pressure associated with the system;

comparing the actual margin pressure to the established margin pressure; and controlling said hydraulic system in response to said comparison.

14. A method, as set forth in claim 13, wherein the step of determining an actual margin pressure further includes the steps of:

determining a pump pressure;

determining a fluid pressure of the heaviest loaded work element; and determining the actual margin pressure in response to a comparison of the pump pressure with the pressure of the heaviest loaded work element.

15. A method, as set forth in claim 14, wherein the step of controlling said hydraulic system further includes the step of outputting appropriate signals to the control valves to limit fluid flow to the control valves when the actual margin pressure is less than the established margin pressure.

16. A method, as set forth in claim 14, wherein the step of controlling said hydraulic system further includes the step of establishing a fluid distribution scheme in response to said actual margin pressure being less than said established margin pressure.

17. A method, as set forth in claim 16, wherein said fluid distribution scheme includes one of a priority scheme and a proportional distribution scheme.

18. A control system for detecting a saturation condition in a hydraulic system of a work machine wherein the hydraulic system includes a hydraulic pump for supplying fluid under pressure to the hydraulic system, a plurality of control valves for controllably passing fluid from the pump to a plurality of work elements, the control system comprising:

at least one operator input device actuatable to control the operation of the work elements;

a controller coupled to said at least one operator input device and being operable to receive signals therefrom, each signal from said at least one operator input device being indicative of a commanded fluid flow to at least one of the respective work elements;

said controller outputting signals to the respective control valves to control the fluid flow to the respective work elements when said controller receives signals from said at least one operator input device indicative of a commanded fluid flow to the respective work elements;

memory means for storing parameters associated with the hydraulic system including an established margin pressure;

said controller being operable to determine an actual margin pressure associated with the hydraulic system; and said controller being further operable to compare the actual margin pressure to the established margin pressure and detect said saturation condition in response to said comparison.

19. A system, as set forth in claim 18, wherein said controller is further configured to determine said actual margin pressure in response to the comparison of the pump pressure and the pressure of the highest load work element.

20. A system, as set forth in claim 19, wherein said controller is further configured to establish a fluid distribution scheme in response to said actual margin pressure being less than said established margin pressure.

21. A system, as set forth in claim 20, wherein said fluid distribution scheme includes one of a priority scheme and a proportional distribution scheme.

22. A system, as set forth in claim 19, wherein said controller is further configured to output appropriate signals to the control valves to establish a predetermined fluid flow to the respective work elements when the actual margin pressure of the pump is less than the established margin pressure.

* * * * *